(12) United States Patent
Von Novak, III (10) Patent No.: US 8,970,184 B2
(45) Date of Patent: Mar. 3, 2015

(54) APPARATUS AND METHOD FOR IMPROVING POWER FACTOR OF A POWER SYSTEM

(71) Applicant: QUALCOMM Incorporated, San Diego, CA (US)

(72) Inventor: William H. Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 13/669,390

(22) Filed: Nov. 5, 2012

(65) Prior Publication Data

US 2014/0097806 A1    Apr. 10, 2014

Related U.S. Application Data

(60) Provisional application No. 61/710,630, filed on Oct. 5, 2012.

(51) Int. Cl.
*G05F 1/56* (2006.01)
*G05F 1/565* (2006.01)

(52) U.S. Cl.
USPC .......................................... 323/205; 323/282

(58) Field of Classification Search
USPC ....... 363/20, 16, 21.01 M, 21.02, 21.03, 21.1, 363/21.11, 95, 97, 131; 323/205, 266, 267, 323/268, 271, 282–290
See application file for complete search history.

(56) References Cited

U.S. PATENT DOCUMENTS

| | | | |
|---|---|---|---|
| 3,936,727 A | 2/1976 | Kelley, Jr. et al. | |
| 5,465,040 A | 11/1995 | Yasotornrat | |
| 5,519,306 A * | 5/1996 | Itoh et al. | 323/222 |
| 5,638,265 A * | 6/1997 | Gabor | 363/89 |
| 7,269,039 B2 * | 9/2007 | Cheng | 363/81 |
| 7,403,400 B2 * | 7/2008 | Stanley | 363/16 |
| 7,531,922 B1 | 5/2009 | Olson | |
| 7,542,257 B2 | 6/2009 | McCormick et al. | |
| 7,911,812 B2 * | 3/2011 | Colbeck et al. | 363/21.02 |
| 8,284,571 B2 * | 10/2012 | Colbeck et al. | 363/21.02 |
| 2009/0033296 A1 | 2/2009 | Hammerstrom | |
| 2010/0187914 A1 | 7/2010 | Rada et al. | |
| 2011/0134670 A1 * | 6/2011 | Colbeck et al. | 363/124 |

FOREIGN PATENT DOCUMENTS

EP        1557924 A2    7/2005
JP     H11122928 A    4/1999

OTHER PUBLICATIONS

International Search Report and Written Opinion—PCT/US2013/063321—ISA/EPO—Feb. 17, 2014.

* cited by examiner

*Primary Examiner* — Adolf Berhane
*Assistant Examiner* — Nusrat Quddus
(74) *Attorney, Agent, or Firm* — Howard Seo (57) ABSTRACT

An apparatus, a method, and a computer program product are provided. The apparatus determines an input voltage and an input current of a power system driving a low power factor load, the input voltage varying based on a power cycle, determines at least a first portion of the power cycle at which the input current exceeds a threshold, and couples at least one substantially resistive load to the low power factor load during at least a second portion of the power cycle different from the at least a first portion of the power cycle.

20 Claims, 10 Drawing Sheets

APPARATUS AND METHOD FOR IMPROVING POWER FACTOR OF A POWER SYSTEM

CROSS-REFERENCE TO RELATED APPLICATION(S)

This application claims the benefit of U.S. Provisional Application Ser. No. 61/710,630 entitled "Apparatus and Method for Improving Power Factor" and filed on Oct. 5, 2012, which is expressly incorporated by reference herein in its entirety.

BACKGROUND

1. Field

The present disclosure relates generally to an apparatus and method for improving power factor.

2. Background

The power factor of a circuit may be represented by the ratio between true power and apparent power. When considering the current waveform and voltage waveform of a circuit, the power factor may represent a measure of how much the current waveform is in phase with the voltage waveform in an alternating current (AC) power line. A power factor of 1 indicates that the current is exactly proportional (i.e., in phase) to the AC voltage. A power factor of 1 may occur when the load of a circuit is a purely resistive load, such as an incandescent lamp. Under such purely resistive loads, AC power lines may transmit their rated power. However, circuit loads generally do not allow a high power factor (i.e., a power factor close to 1). For example, the windings of an electric motor may have a significant amount of inductance and, therefore, may delay the current passing through the AC power line. Delaying the current passing through the AC power line may result in circulating current, which is current that the AC power line must carry but which is not used by the circuit load. This reduces the capacity of the AC power system, because the power supply must be rated higher than the load to provide both the load power and the circulating current.

One approach for reducing the effects of phase delayed currents involves the use of "reverse phase" dimmers. These work opposite to the way most dimmers do and turn their loads on from the start of a sinusoidal power cycle, then turn them off halfway through the sinusoidal power cycle. However, such reverse phase dimmers are designed to better drive certain types of capacitive loads and are not designed to improve power factor.

Another approach involves the use of line stabilization networks that operate in several ways. For example, capacitance may be added to the line to adjust away inductive phase delay. However, this approach provides only one fixed correction and, therefore, such addition of capacitance will be effective for only one specific inductive load. As another example, a large LC circuit may be used to provide resonance at 60 Hz. This approach effectively provides a reservoir of additional power when needed due to poor power factor. However, this approach may substantially increase the size of the system and may significantly reduce the efficiency of the system. As another example, an AC input may be converted to direct current (DC) via a high power factor converter and subsequently converted back to AC near the load, so that only the wiring between the converter and the load experiences the low power factor. However, this approach is complex and is not cost effective.

Achieving a high power factor is critical to power utilities, since customers are billed for watts delivered but are provided volt-amps. At poor power factors, the volt-amps provided may be significantly greater than the watts supplied and, therefore, the power utility must deliver (and/or circulate) power they cannot bill the customer for.

SUMMARY

In an aspect of the disclosure, an apparatus, a method, and a computer program product are provided. The apparatus determines an input voltage and an input current of a power system driving a low power factor load, the input voltage varying based on a power cycle, determines at least a first portion of the power cycle at which the input current exceeds a threshold, and couples at least one substantially resistive load to the low power factor load during at least a second portion of the power cycle different from the at least a first portion of the power cycle.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of improving power factor will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
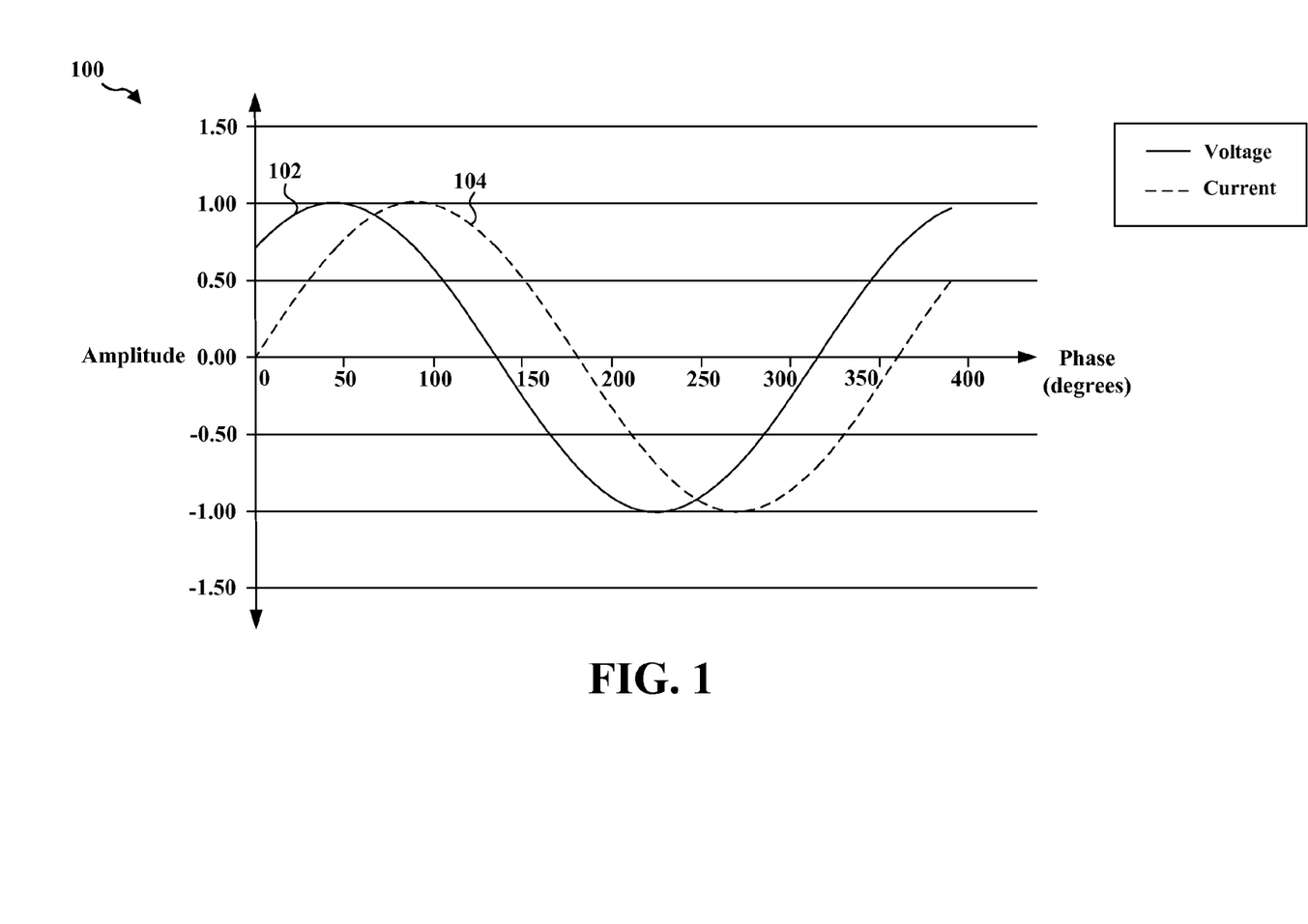
FIG. 1 is a diagram illustrating the phase of an AC input voltage waveform and an input current waveform.

FIG. 1 is a diagram 100 illustrating an AC input voltage waveform 102 received by a circuit and the corresponding input current waveform 104. In FIG. 1, the vertical axis represents amplitude and the horizontal axis represents phase (degrees). As shown in FIG. 1, the current waveform 104 is delayed (i.e., lags) with respect to the AC input voltage waveform 102, which results in a poor power factor. For example, a poor power factor may have a value that is less than 1. Delaying the current passing through the AC power line(s) may result in circulating current, which is current the AC power line(s) must carry and which is not used by the circuit load. This reduces the capacity of the AC power system, because the AC power supply must be rated higher than the load to provide both the load power and the circulating current.

Figure 2:
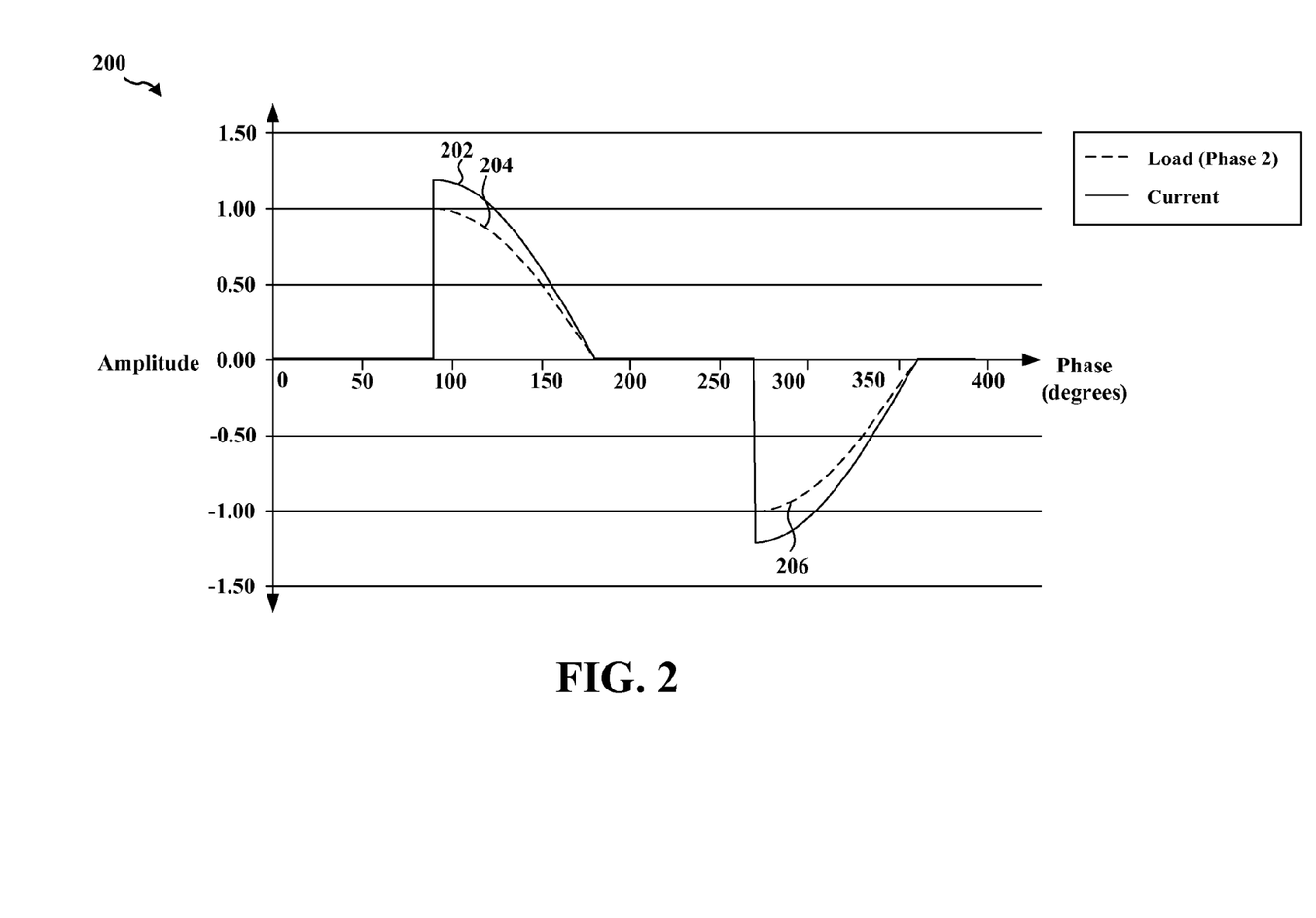
FIG. 2 is a diagram illustrating an input current waveform of a phase control dimmer circuit.

FIG. 2 is a diagram 200 illustrating an input current waveform 202 of a phase control dimmer circuit. In FIG. 2, the vertical axis represents amplitude (amperes) and the horizontal axis represents phase (degrees). A phase control dimmer circuit typically turns on its lighting load, such as tungsten filament lamp or a halogen lamp, partway through the power cycle. A power cycle may be defined as one complete cycle of an input voltage waveform, such as a sinusoidal AC voltage waveform. In the configuration of FIG. 2, the lighting load is turned on and draws current during portions 204 and 206 of the power cycle. For example, as indicated by portions 204 and 206, the lighting load is turned on at approximately 90 degrees and turned off at approximately 180 degrees, and subsequently turned on at approximately 270 degrees and turned off at approximately 360 degrees. Since the lighting load is turned on only during portions 204 and 206, the control dimmer circuit draws current only during portions of the power cycle corresponding to portions 204 and 206 as indicated by input current waveform 202. As a result, the power factor of the phase control dimmer circuit may be substantially reduced. Consequently, a power system delivering power to the lighting load must be designed to deliver substantially higher peak currents than would otherwise be required.

Figure 3:
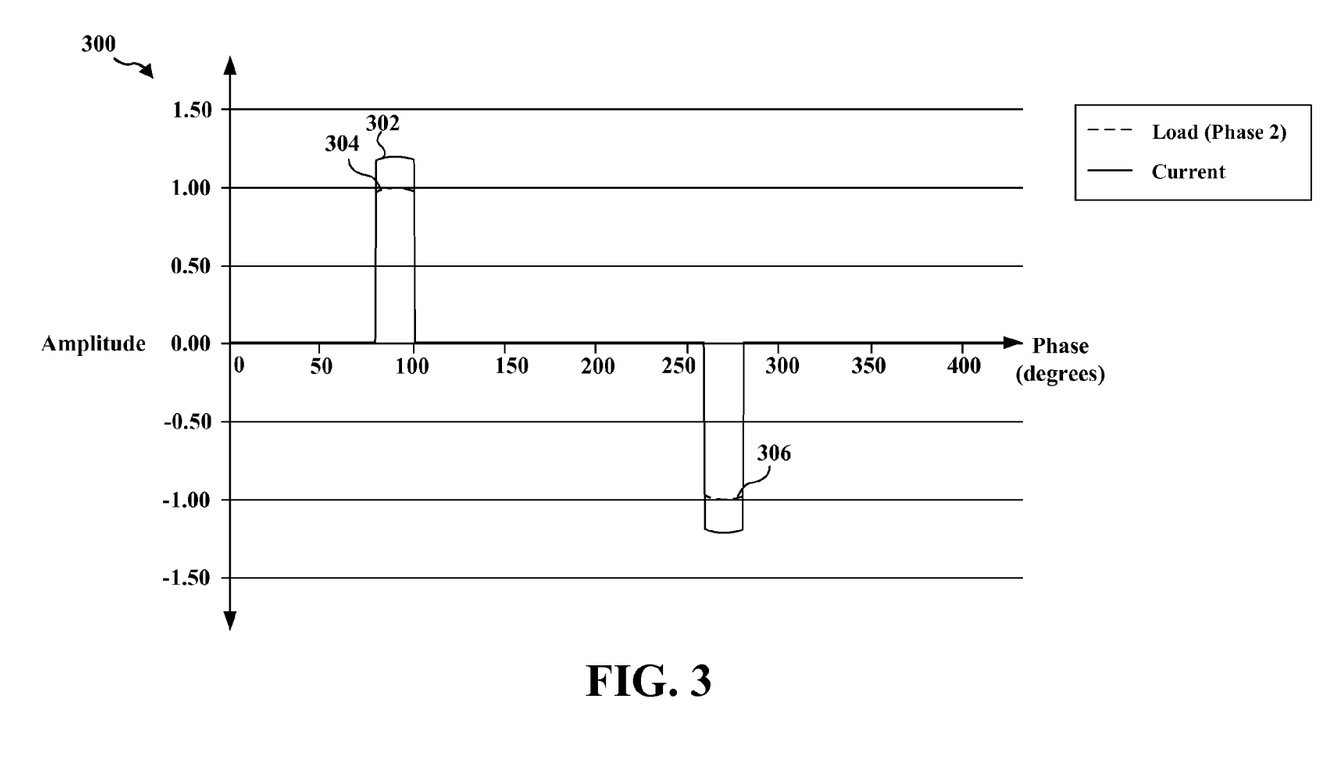
FIG. 3 is a diagram illustrating an input current waveform of an AC to DC power converter circuit.

FIG. 3 is a diagram 300 illustrating an input current waveform 302 of an AC to DC power converter circuit. In FIG. 3, the vertical axis represents amplitude (amperes) and the horizontal axis represents phase. An AC to DC power converter circuit typically employs a rectifier to rectify AC power to DC power. In the configuration of FIG. 3, the rectifier in the AC to DC power converter circuit conducts and draws current only during portions 304 and 306 of the power cycle. For example, as indicated by portions 304 and 306, the rectifier in the AC to DC power converter circuit starts conducting at approximately 80 degrees and stops conducting at approximately 100 degrees, and subsequently conducts at approximately 260 degrees stops conducting at approximately 280 degrees. Since the rectifier in the AC to DC power converter circuit conducts only during portions 304 and 306, the AC to DC power converter circuit draws current only during portions of the power cycle corresponding to portions 304 and 306 as indicated by input current waveform 302. As a result, the power factor of the AC to DC power converter circuit may be substantially reduced. Consequently, a power system delivering power to the AC to DC power converter circuit must be designed to deliver substantially higher peak currents than would otherwise be required.

Figure 4:
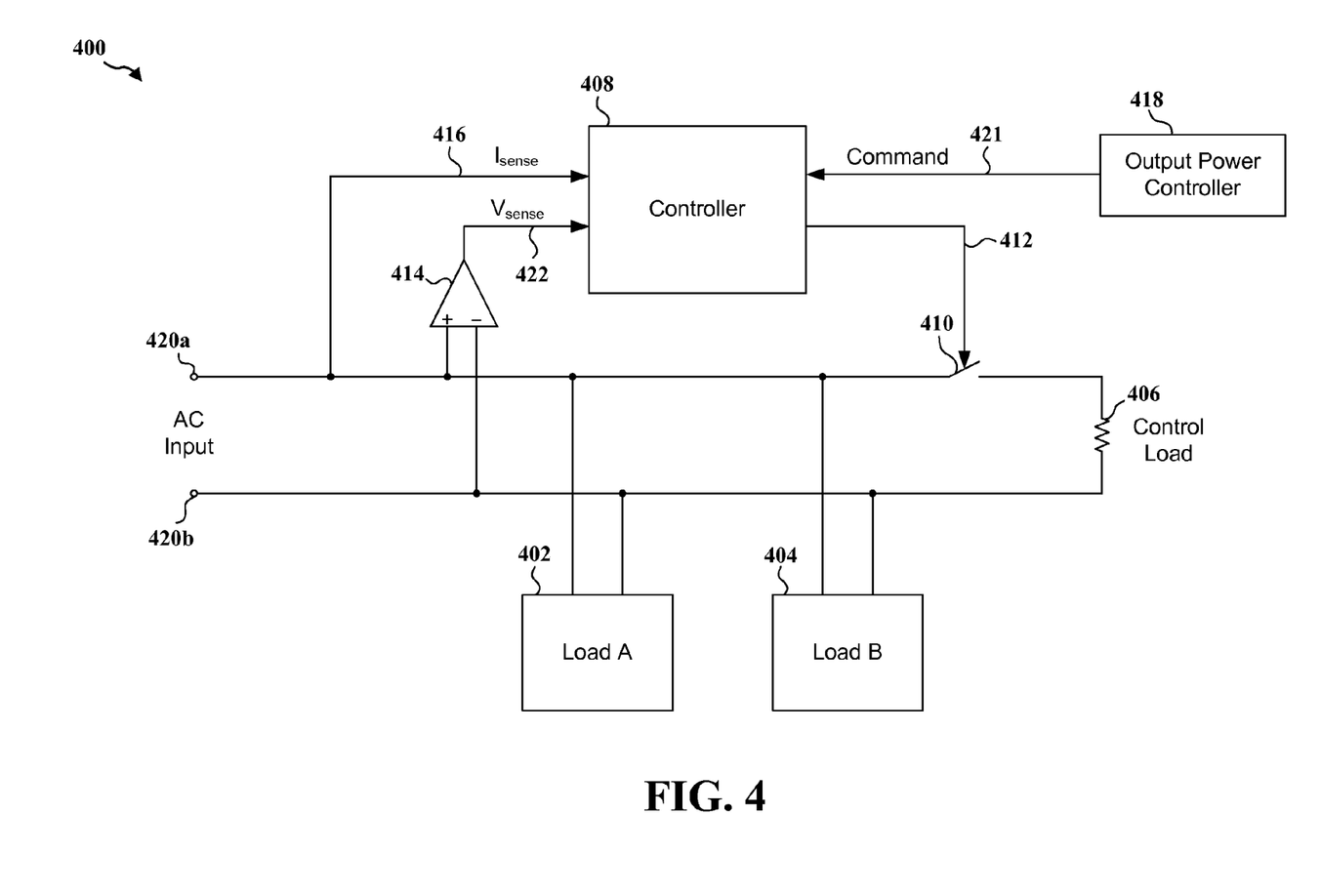
FIG. 4 is a block diagram illustrating a system for improving power factor.

FIG. 4 is a block diagram illustrating a system 400 for improving power factor. As shown in FIG. 4, system 400 includes load A 402, load B 404, control load 406, controller 408, switch 410, voltage sensor 414, and output power controller 418. As shown in FIG. 4, load A 402 and load B 404 are coupled to the AC power inputs 420a and 420b of the system 400. The load A 402 and/or load B 404 may be a low power factor load. In one configuration, load A 402 and/or load B 404 may be an inductive load, such as a motor. In other configurations, load A 402 and/or load B 404 may be a resistive load that is tuned on only during portions of a power cycle. It should be understood that additional or fewer loads may be coupled to the AC power input of the system 400 in other configurations. As further shown in FIG. 4, the control load 406 is coupled to the AC power inputs 420a and 420b and is electrically in parallel with the load A 402 and load B 404. In one configuration, the control load 406 may be a substantially resistive load. In another configuration, the control load 406 may be a purely resistive load. For example, the control load 406 may be one or more tungsten filament lamps or heater elements.

As shown in FIG. 4, a first input of the voltage sensor 414 may be coupled to AC power input 420a and a second input of the voltage sensor 414 may be coupled to AC power input 420b. The voltage sensor 414 may be configured to measure the voltage of the AC power input and provide the measured voltage to the controller 408 via signal ("$V_{sense}$") 422. In one configuration, the voltage sensor 414 may be an operational amplifier. For example, the controller 408 may be a processor or a microcontroller. As further shown in FIG. 4, the current at the AC power input 420a may be measured by the controller 408 using a signal ("$I_{sense}$") 416. The controller 408 may be configured to provide a signal 412 for controlling the switch 410. In one configuration, the switch 410 is configured to couple the control load 406 to the load A 402 and the load B 404 when closed and to no longer couple the control load 406 to the load A 402 and the load B 404 when opened. As further shown in FIG. 4, the output power controller 418 may control the output power level by providing a command 421. For example, the command 421 may be a voltage signal. The controller 408 may receive the command 421 and determine appropriate portions of the power cycle to incorporate the requested power in order to minimize additional distortion of the AC power source.

An exemplary operation of the system 400 will now be described. An AC power source (not shown) may provide AC power to AC inputs 420a and 420b. For example, the AC power may be a sinusoidal voltage waveform. A power cycle of the system 400 may be defined as one complete cycle (e.g., 0 to 360 degrees) of such sinusoidal voltage waveform. In one configuration, the controller 408 may analyze the power factor of the system 400 by measuring the current and the voltage from the AC power source at AC input 420a. In another configuration, the controller 408 may analyze the power factor of the system 400 by measuring a voltage drop with respect to an input node (e.g., AC input 420a) and determining the current from the AC power source based on the voltage drop. The controller 408 may then determine one or more portions of the voltage waveform where the load A 402 and load B 404 are drawing the most current. In one configuration, the determination may be made by determining whether the current from the AC power source exceeds a threshold value. The controller 408 may then couple the control load 406 to the load A 402 and the load B 404 during portions of the power cycle that are different from the one or more portions where the load A 402 and load B 404 are drawing the most power. For example, the controller 408 may couple the control load 406 to the load A 402 and the load B 404 by closing the switch 410.

In one aspect, the controller 408 may optionally receive a command 421 from output power controller 418 and determine an amount of average power that should be delivered to the control load 406. The controller 408 may then rapidly open and close the switch 410 to connect and disconnect the control load 406 from the AC power source during portions of the power cycle that are different from the one or more portions where the load A 402 and load B 404 are drawing the most power. In one configuration, the controller 408 may rapidly open and close the switch 410 according to a pulse width modulation (PWM) scheme, such that an average level of power is drawn from the AC power source. In another configuration, the controller 408 may open and close the switch 410 at a relatively slower rate such that more constant levels of power are drawn from the AC power source.

Figure 5:
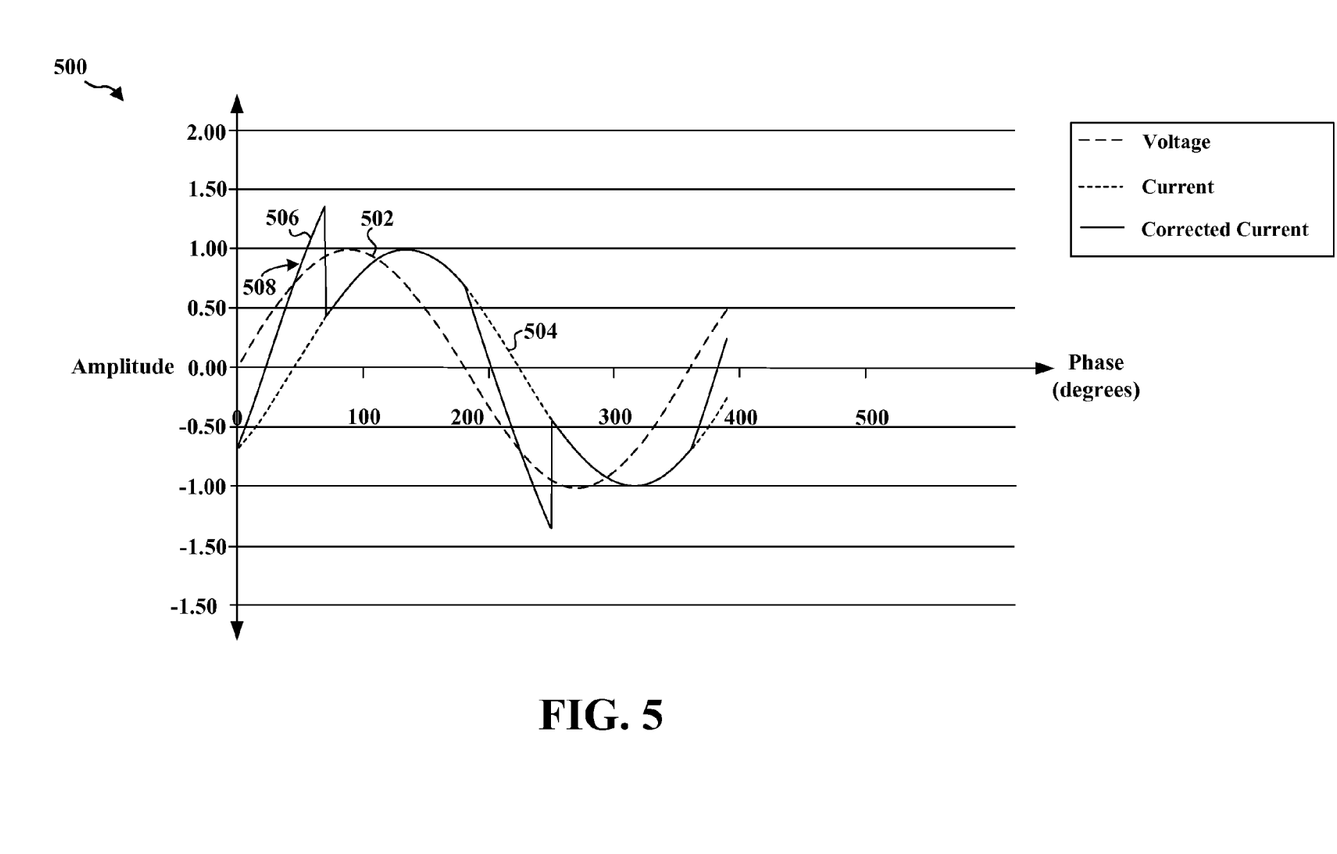
FIG. 5 is a diagram illustrating the phase and amplitude of an AC input voltage waveform and an input current waveform.

An exemplary operation of system 400 will now be described with reference to FIG. 5. FIG. 5 is a diagram 500 illustrating an AC input voltage waveform 502 and an input current waveform 504. In FIG. 5, the vertical axis represents amplitude and the horizontal axis represents phase (degrees). In the configuration of FIG. 5, the AC input voltage waveform 502 is a sinusoidal voltage waveform. As shown in FIG. 5, the input current waveform 504 lags the AC input voltage waveform 502 due to the inductance of loads A and B 402, 404. Consequently, the power factor of the system 400 is reduced. In order to improve the power factor, the controller 408 may analyze the power factor of the system 400 by measuring the current and the voltage from the AC power source at AC input 420a, or by measuring a voltage drop with respect to an input node (e.g., AC input 420a) and determining the current from the AC power source based on the voltage drop. The controller 408 may determine one or more portions of the power cycle where the current from the AC power source exceeds a threshold value. For example, the controller 408 may determine that the amplitude of the input current waveform 504 exceeds a threshold from approximately 75 degrees to 200 degrees of the power cycle. The controller 408 may then couple the control load 406 to the load A 402 and the load B 404 during portions of the power cycle that are different from the one or more portions where the current from the AC power source exceeds the threshold value. For example, the controller 408 may couple the control load 406 to the load A 402 and the load B 404 by closing the switch 410 from approximately 0 degrees to 75 degrees of the power cycle. The coupling of the control load 406 causes the corrected input current waveform 506 to be more aligned with the AC input voltage waveform 502 as indicated by portion 508 of the corrected input current waveform 506, and causes the input current waveform 504 to cross the horizontal axis at an earlier point (i.e., closer to the ideal point where the AC input voltage waveform 502 crosses the horizontal axis). Therefore, the phase delay of the input current waveform 504 with respect to the AC input voltage waveform 502 is reduced, which improves the power factor of the system 400. Also, more total power may be available from a combination of loads 402, 404 and 406 than would be available from loads 402 and 404 alone without increasing peak currents within the system.

In one aspect, a different threshold value may be applied for the second half of the power cycle. For example, the second threshold value may be −0.5 and the controller 408 may determine that the amplitude of input current waveform 504 is below −0.5 from approximately 250 degrees to the end of the power cycle. The controller 408 may couple the control load 406 to the load A 402 and the load B 404 by closing the switch 410 from approximately 200 degrees to 250 degrees of the power cycle. The coupling of the control load 406 causes the system 400 to draw current from approximately 200 degrees to 250 degrees of the power cycle as indicated by input current waveform 506.

Figure 6:
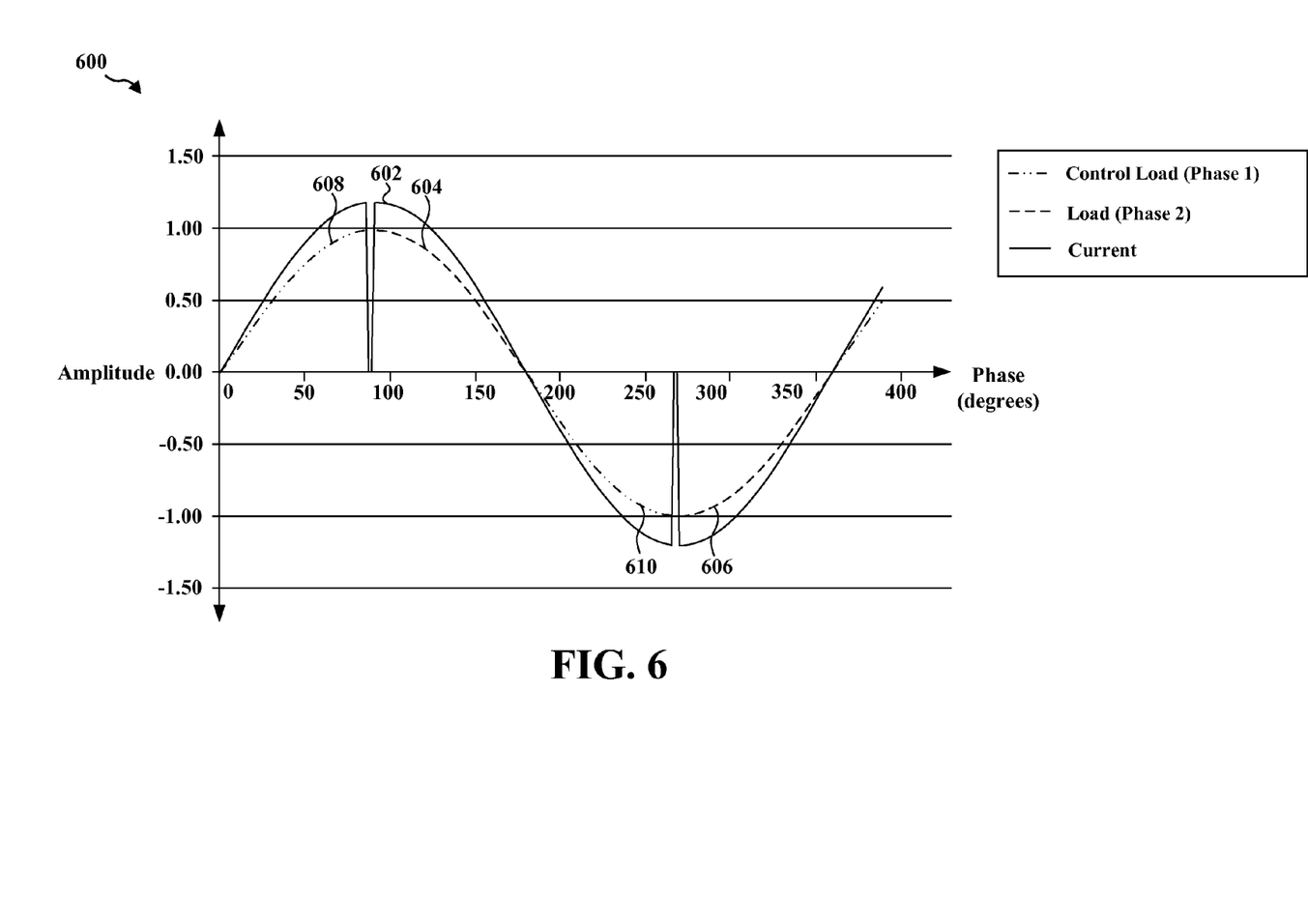
FIG. 6 is a diagram illustrating an input current waveform.

An exemplary operation of system 400 will now be described with reference to FIG. 6. FIG. 6 is a diagram 600 illustrating an input current waveform 602. In one configuration, the system 400 may be a phase control dimmer circuit, and the load A 402 and/or load B 404 may be a lighting load, such as a tungsten filament lamp or a halogen lamp. In FIG. 6, the vertical axis represents amplitude (current) and the horizontal axis represents phase (degrees). The lighting load may be turned on only during portions of the power cycle. In the configuration of FIG. 6, the lighting load is turned on and draws current during portions 604 and 606 of the power cycle. For example, as indicated by portions 604 and 606, the lighting load is turned on from approximately 90 degrees to 180 degrees of the power cycle and from approximately 270 degrees to 360 degrees of the power cycle. Therefore, the system 400 draws current only during these portions of the power cycle. Consequently, the power factor of the system 400 may be reduced.

In order to improve the power factor, the controller 408 may analyze the power factor of the system 400 by measuring the current and the voltage from the AC power source at AC input 420a or by measuring a voltage drop with respect to an input node (e.g., AC input 420a) and determining the current from the AC power source based on the voltage drop. The controller 408 may determine one or more portions of the power cycle where the current from the AC power source exceeds a threshold value. For example, with reference to FIG. 6, the controller 408 may determine that the amplitude of the current waveform 602 exceeds a threshold from approximately 90 degrees to 180 degrees of the power cycle. The controller 408 may then couple the control load 406 to the load A 402 and the load B 404 during portions of the power cycle that are different from the one or more portions where the current from the AC power source exceeds the threshold value. For example, the controller 408 may couple the control load 406 to the load A 402 and the load B 404 by closing the switch 410 from approximately 0 degrees to 90 degrees of the power cycle as indicated by portion 608. The coupling of the control load 406 causes the system 400 to draw current from approximately 0 degrees to 90 degrees of the power cycle as indicated by current waveform 602.

In one aspect, a different threshold value may be applied for the second half of the power cycle (e.g., between 180 degrees to 360 degrees in FIG. 6). For example, the controller 408 may couple the control load 406 to the load A 402 and the load B 404 by closing the switch 410 from approximately 180 degrees to 270 degrees of the power cycle. The coupling of the control load 406 causes the system 400 to draw current from approximately 180 degrees to 270 degrees of the power cycle as indicated by the portion 610.

In FIG. 6, the current drawn by the system 400 is indicated by the current waveform 602. Therefore, by coupling the control load 406 to the load A 402 and load B 404 at portions 608 and 610 of the power cycle, the current drawn by the system 400 approximates a complete sine wave over the entire power cycle and is in phase with the power cycle, which improves the power factor of the system 400. Also, more total power may be available from a combination of loads 402, 404 and 406 than would be available from loads 402 and 404 alone without increasing peak currents within the system.

Figure 7:
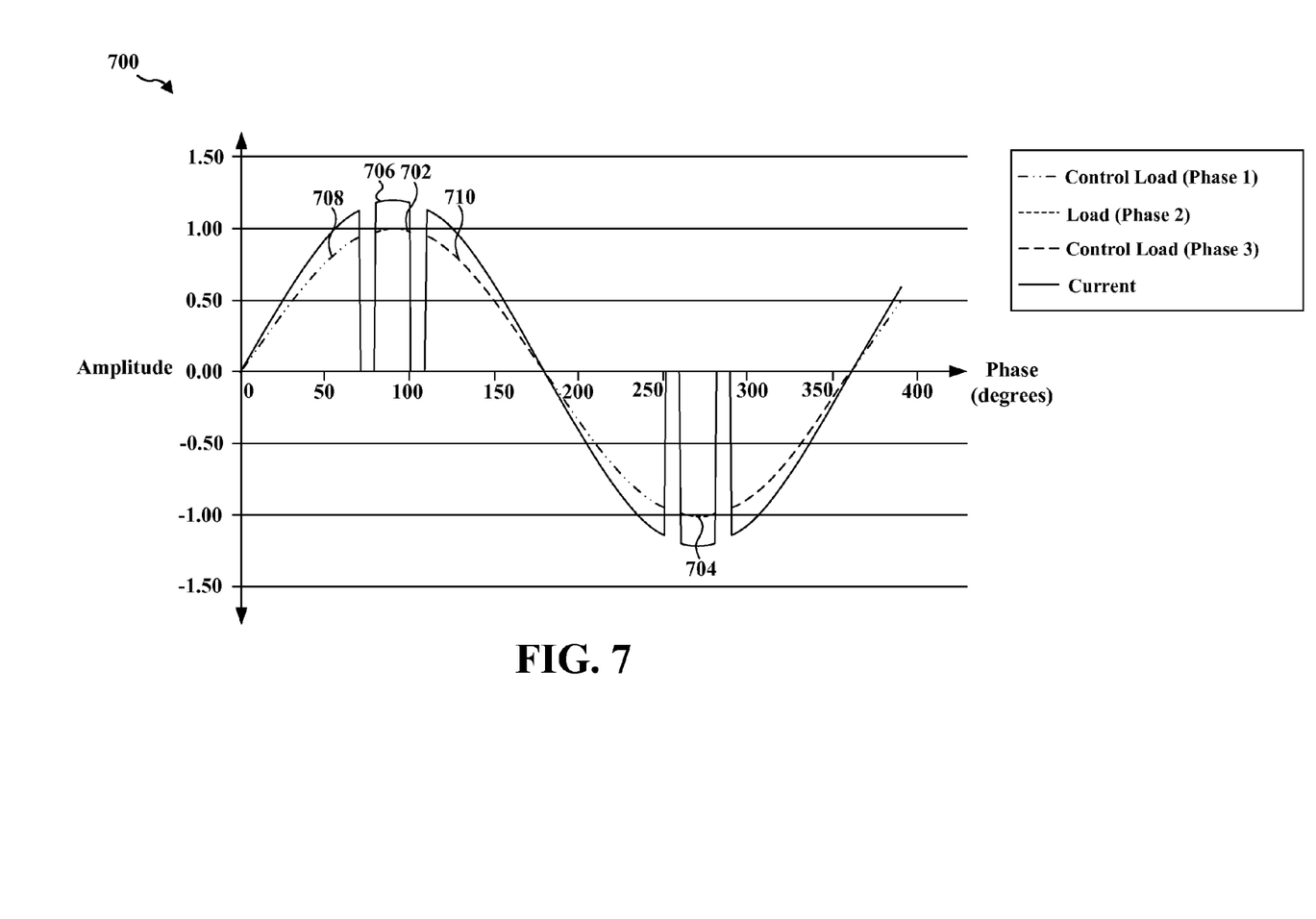
FIG. 7 is a diagram illustrating an input current waveform.

An exemplary operation of system 400 will now be described with reference to FIG. 7. FIG. 7 is a diagram 700 illustrating an input current waveform 706. In one configuration, the load A 402 and/or the load B 404 may be an AC to DC power converter circuit that includes a rectifier. In FIG. 7, the vertical axis represents amplitude (amperes) and the horizontal axis represents phase (degrees). In the configuration of FIG. 7, the load of the AC to DC power converter circuit is turned on and draws current only during portions 702 and 704 of the power cycle. For example, as indicated by portions 702 and 704, the load of the AC to DC power converter circuit is turned on at approximately 80 degrees and turned off at approximately 100 degrees, and subsequently turned on at approximately 260 degrees and turned off at approximately 280 degrees. Since the load of the AC to DC power converter circuit is turned on only during portions 702 and 704, the load of the AC to DC power converter circuit draws high peak currents only during the indicated portions 702 and 704. As a result, the power factor of the system 400 may be reduced.

In order to improve the power factor, the controller 408 may analyze the power factor of the system 400 by measuring the current and the voltage from the AC power source (not shown) at AC input 420a or by measuring a voltage drop with respect to an input node (e.g., AC input 420a) and determining the current from the AC power source based on the voltage drop. The controller 408 may determine one or more portions of the power cycle where the current from the AC power source exceeds a threshold value. For example, the controller 408 may determine that the amplitude of the input current waveform 706 exceeds a threshold from approximately 80 degrees to 100 degrees of the power cycle. The controller 408 may then couple the control load 406 to the load A 402 and the load B 404 during portions of the power cycle that are different from the one or more portions where the current from the AC power source exceeds the threshold value. For example, the controller 408 may couple the control load 406 to the load A 402 and the load B 404 by closing the switch 410 from approximately 0 degrees to 80 degrees of the power cycle as indicated by portion 708. Subsequently, the controller 408 may couple the control load 406 to the load A 402 and the load B 404 by closing the switch 410 from approximately 100 degrees to 180 degrees of the power cycle as indicated by portion 710. The coupling of the control load 406 causes the system 400 to draw current from approximately 0 degrees to 80 degrees of the power cycle and from approximately 100 degrees to 180 degrees of the power cycle as indicated by the input current waveform 706.

In one aspect, a different threshold value may be applied for the second half of the power cycle (e.g., between 180 degrees to 360 degrees in FIG. 7). For example, the controller 408 may couple the control load 406 to the load A 402 and the load B 404 by closing the switch 410 from approximately 180 degrees to 260 degrees of the power cycle and from approximately 280 degrees to 360 degrees of the power cycle. The coupling of the control load 406 causes the system 400 to draw current from approximately 180 degrees to 260 degrees and from approximately 280 degrees to 360 degrees of the power cycle as indicated by the input current waveform 706.

In FIG. 7, the current drawn by the system 400 is indicated by the input current waveform 706. Therefore, by coupling the control load 406 to load A 402 and load B 404 as previously discussed, the current drawn by the system 400 approximates a complete sine wave over the entire power cycle and is in phase with the power cycle. As a result, the power factor of the system 400 may be improved. Also, more total power may be available from a combination of loads 402, 404 and 406 than would be available from loads 402 and 404 alone without increasing peak currents within the system.

Figure 8:
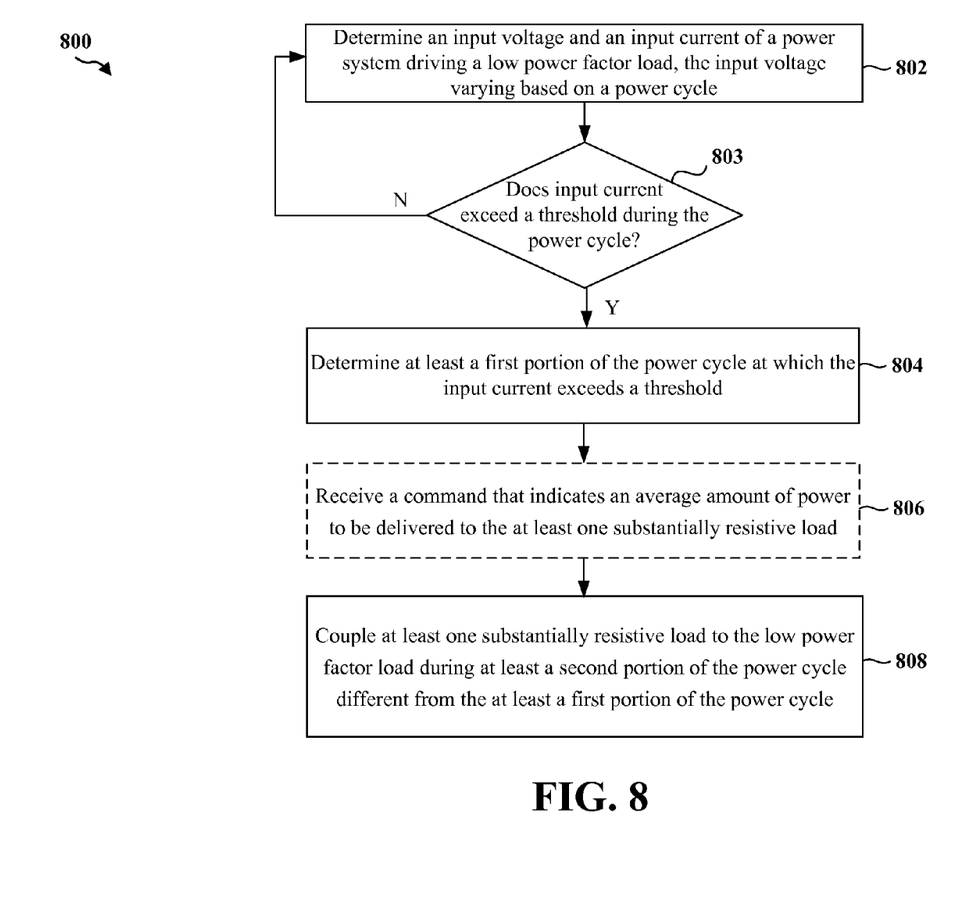
FIG. 8 is a flow chart of a method for improving power factor of a system.

FIG. 8 is a flow chart 800 of a method for improving power factor of a system. At step 802, the system (e.g., system 400 in FIG. 4) determines an input voltage and an input current of a power system driving a low power factor load, the input voltage varying based on a power cycle. For example, the low power factor load may be an inductive load or a phase controlled load (e.g., a load that is turned on only during portions of a power cycle). For example, the input voltage may be AC power having a sinusoidal voltage waveform. In one aspect, the system determines the input current by determining a voltage drop with respect to an input node of the system and determines the input current using the voltage drop. For example, with reference to FIG. 4, the controller 408 may measure a voltage drop with respect to the AC input 420a and determine the input current from the AC power source (not shown) based on the voltage drop.

At step 803, the system determines whether the input current exceeds a threshold during the power cycle. If the input current does exceed the threshold, then at step 804, the system determines at least a first portion of the power cycle at which the input current exceeds the threshold. For example, with reference to FIG. 5, if the threshold value is set to 0.5, the controller 408 may determine the portions of the power cycle where the amplitude of the input current waveform 504 exceeds 0.5. In the present example, the controller 408 may determine that the amplitude of the input current waveform 504 exceeds 0.5 from approximately 75 degrees to 200 degrees of the power cycle. As another example, with reference to FIG. 6, if the threshold value is set to 0.1, the controller 408 may determine the portions of the power cycle where the amplitude of the input current waveform 602 exceeds 0.1. In the present example, the controller 408 may determine that the amplitude of the current waveform 602 exceeds 0.1 from approximately 90 degrees to 180 degrees of the power cycle.

As another example, with reference to FIG. 7, if the threshold value is set to 0.1, the controller 408 may determine the portions of the power cycle where the amplitude of the AC input current waveform 706 exceeds 0.1. In the present example, the controller 408 may determine that the amplitude of input current waveform 706 exceeds 0.1 from approximately 80 degrees to 100 degrees of the power cycle. In one aspect, the threshold value may be normalized by the voltage waveform. For example, a 0.5 threshold would result in a current threshold that was below one half of the measured voltage waveform at any given time.

At step 806, the system may receive a command that indicates an average amount of power to be delivered to at least one substantially resistive load. For example, with reference to FIG. 4, the substantially resistive load may be a control load, such as control load 406, which may be coupled to poor power factor loads, such as load A 402 and/or load B 404. For example, the substantially resistive load may be one or more tungsten filament lamps. In one aspect, with reference to FIG. 4, the output power controller 418 may control the output power level by providing a command 421. In one configuration, the command 421 may be a voltage signal. The controller 408 may receive the command 421 and determine appropriate portions of the power cycle to incorporate the requested power in order to minimize additional distortion of the AC power source.

At step 808, the system couples the at least one substantially resistive load to the low power factor load during at least a second portion of the power cycle different from the at least a first portion of the power cycle. In one aspect, the coupling may be performed by repeatedly connecting and disconnecting the at least one substantially resistive load to the low power factor load to deliver an average amount of power to at least one substantially resistive load. For example, with reference to FIG. 5, the controller 408 may couple the control load 406 to the load A 402 and the load B 404 by closing the switch 410 from approximately 0 degrees to 75 degrees of the power cycle. As another example, with reference to FIG. 6, the controller 408 may couple the control load 406 to the load A 402 and the load B 404 by closing the switch 410 from approximately 0 degrees to 90 degrees of the power cycle as indicated by portion 608. As another example, the controller 408 may couple the control load 406 to the load A 402 and the load B 404 by closing the switch 410 from approximately 0 degrees to 80 degrees of the power cycle as indicated by portion 708. Subsequently, the controller 408 may couple the control load 406 to the load A 402 and the load B 404 by closing the switch 410 from approximately 100 degrees to 180 degrees of the power cycle as indicated by portion 710.

Figure 9:
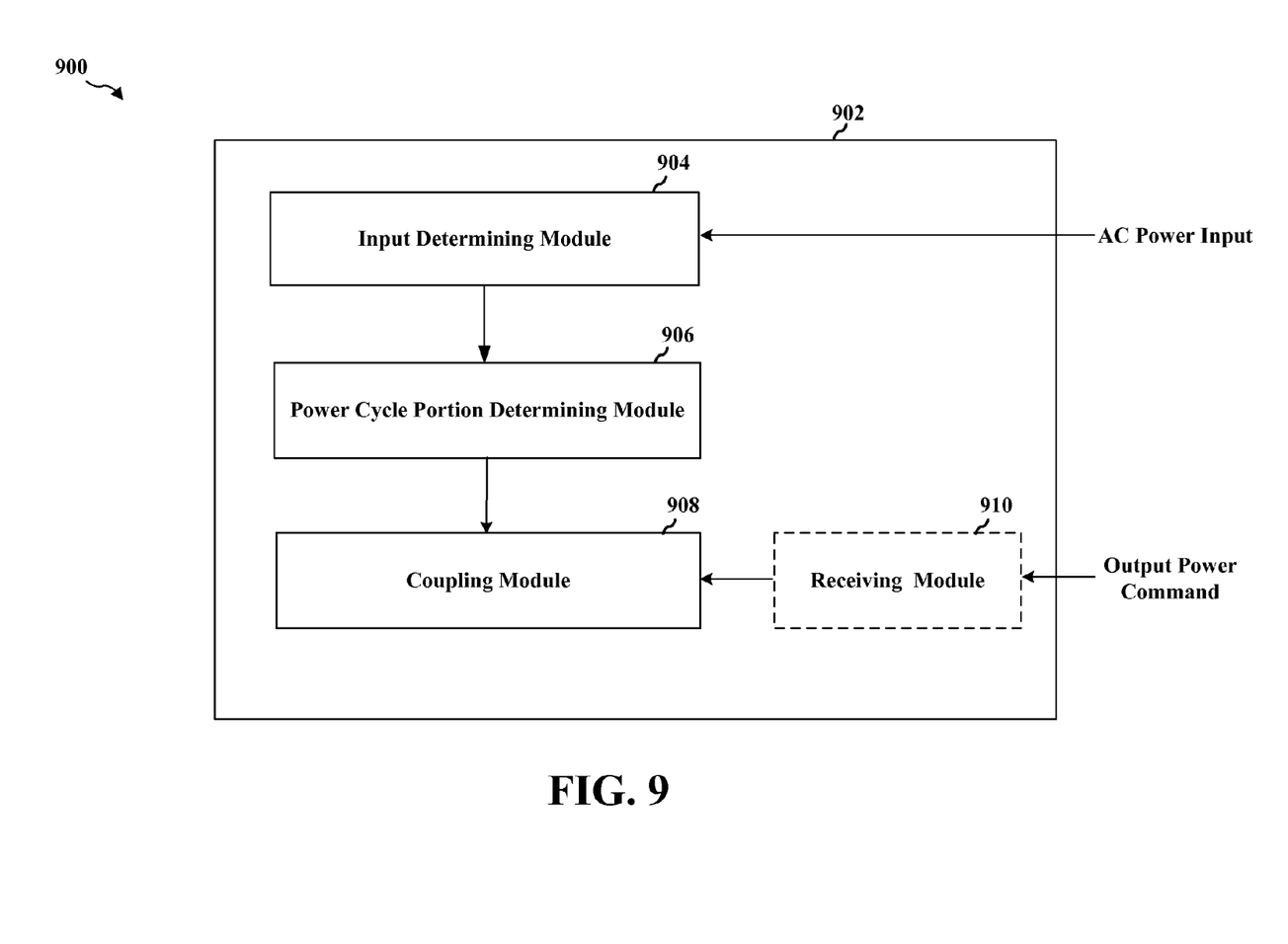
FIG. 9 is a conceptual flow diagram illustrating the operation of different modules/means/components in an exemplary apparatus.

FIG. 9 is a conceptual flow diagram 900 illustrating the operation of different modules/means/components in an exemplary apparatus 902. The apparatus 902 includes an input determining module 904, a power cycle portion determining module 906, a coupling module 908, and a receiving module 910.

The input determining module 904 determines an input voltage and an input current of a power system driving a low power factor load. For example, the input voltage may be a sinusoidal AC power input. In one configuration, the input determining module 904 may be configured to determine a voltage drop with respect to an input node of the system and to determine the input current using the voltage drop. The power cycle portion determining module 906 determines at least a first portion of the power cycle at which the input current exceeds a threshold. The coupling module 908 couples at least one substantially resistive load to the low power factor load during at least a second portion of the power cycle different from the at least a first portion of the power cycle. For example, the substantially resistive load may be one or more tungsten filament lamps.

In one configuration, the coupling module 908 may be configured to repeatedly connect and disconnect the at least one substantially resistive load to the low power factor load to deliver the average amount of power to the at least one substantially resistive load. The receiving module 910 receives a command that indicates an average amount of power to be delivered to the at least one substantially resistive load.

The apparatus may include additional modules that perform each of the steps in the aforementioned flow chart of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
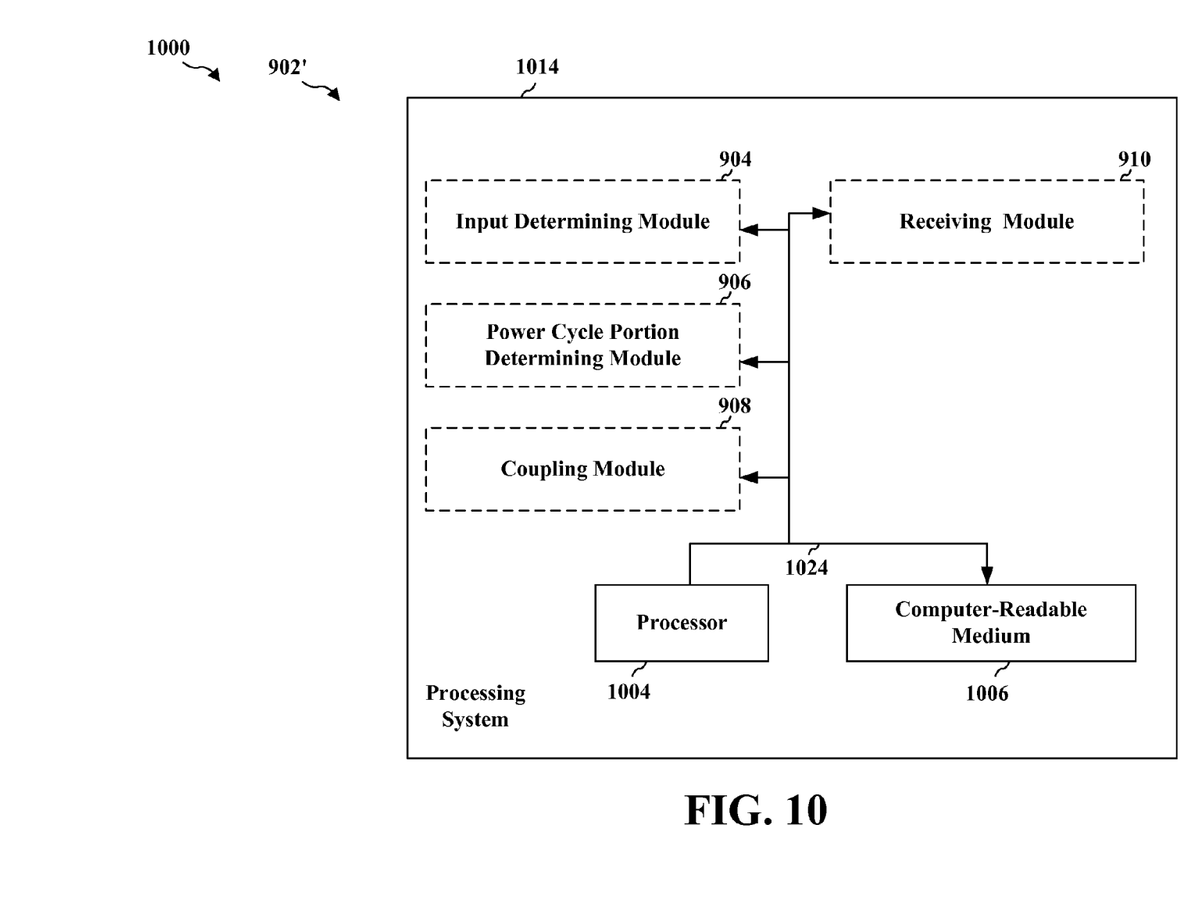
FIG. 10 is a diagram illustrating an example of a hardware implementation for an apparatus employing a processing system.

FIG. 10 is a diagram illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, and 910, and the computer-readable medium 1006. The bus 1024 may also link various other circuits such as timing sources, peripherals, voltage regulators, and power management circuits, which are well known in the art, and therefore, will not be described any further.

The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, and 910. The modules may be software modules running in the processor 1004, resident/stored in the computer readable medium 1006, one or more hardware modules coupled to the processor 1004, or some combination thereof.

In one configuration, the apparatus 902/902' includes means for determining an input voltage and an input current of a power system driving a low power factor load, the input voltage varying based on a power cycle, means for determining at least a first portion of the power cycle at which the input current exceeds a threshold, means for receiving a command that indicates an average amount of power to be delivered to at least one substantially resistive load, and means for coupling the at least one substantially resistive load to the low power factor load during at least a second portion of the power cycle different from the at least a first portion of the power cycle. The aforementioned means may be one or more of the aforementioned modules of the apparatus 902 and/or the processing system 1014 of the apparatus 902' configured to perform the functions recited by the aforementioned means.

Therefore, the aspects described herein may improve power factor of a system without adding significant cost or complexity. The aspects described herein may allow the use of power that would otherwise be dissipated as circulating current or that is not used due to the peaky nature of the power draw and provide additional capacity on a system that is already at its peak current limit due to poor power factor loads.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for increasing power factor, the method comprising:
   determining an input voltage and an input current of a power system driving a low power factor load, the input voltage varying based on a power cycle;
   determining at least a first portion of the power cycle at which the input current exceeds a threshold; and
   coupling at least one substantially resistive load to the low power factor load during at least a second portion of the power cycle different from the at least a first portion of the power cycle, wherein the input current is less than or equal to the threshold during the at least a second portion of the power cycle.

2. The method of claim 1, further comprising receiving a command that indicates an average amount of power to be delivered to the at least one substantially resistive load.

3. A method for increasing power factor, the method comprising:
   determining an input voltage and an input current of a power system driving a low power factor load, the input voltage varying based on a power cycle;
   determining at least a first portion of the power cycle at which the input current exceeds a threshold;
   receiving a command that indicates an average amount of power to be delivered to the at least one substantially resistive load; and
   coupling at least one substantially resistive load to the low power factor load during at least a second portion of the power cycle different from the at least a first portion of the power cycle, wherein the coupling comprises repeatedly connecting and disconnecting the at least one substantially resistive load to the low power factor load to deliver the average amount of power to the at least one substantially resistive load.

4. The method of claim 1, wherein the determining the input current comprises:
   determining a voltage drop with respect to an input node of the system; and
   determining the input current using the voltage drop.

5. The method of claim 1, wherein the low power factor load comprises at least one of an inductive load and a phase controlled load.

6. An apparatus for increasing power factor, comprising:
   means for determining an input voltage and an input current of a power system driving a low power factor load, the input voltage varying based on a power cycle;
   means for determining at least a first portion of the power cycle at which the input current exceeds a threshold; and
   means for coupling at least one substantially resistive load to the low power factor load during at least a second portion of the power cycle different from the at least a first portion of the power cycle, wherein the input current is less than or equal to the threshold during the at least a second portion of the power cycle.

7. The apparatus of claim 6, comprising:
   means for receiving a command that indicates an average amount of power to be delivered to the at least one substantially resistive load.

8. An apparatus for increasing power factor, comprising:
   means for determining an input voltage and an input current of a power system driving a low power factor load, the input voltage varying based on a power cycle;
   means for determining at least a first portion of the power cycle at which the input current exceeds a threshold;
   means for receiving a command that indicates an average amount of power to be delivered to the at least one substantially resistive load; and
   means for coupling at least one substantially resistive load to the low power factor load during at least a second portion of the power cycle different from the at least a first portion of the power cycle, wherein the means for coupling is configured to repeatedly connect and disconnect the at least one substantially resistive load to the low power factor load to deliver the average amount of power to the at least one substantially resistive load.

9. The apparatus of claim 6, wherein the means for determining is configured to:
   determine a voltage drop with respect to an input node of the system; and determine the input current using the voltage drop.

10. The apparatus of claim 6, wherein the low power factor load comprises at least one of an inductive load and a phase controlled load.

11. An apparatus for increasing power factor, comprising:
    a processing system configured to:
    determine an input voltage and an input current of a power system driving a low power factor load, the input voltage varying based on a power cycle;
    determine at least a first portion of the power cycle at which the input current exceeds a threshold; and
    couple at least one substantially resistive load to the low power factor load during at least a second portion of the power cycle different from the at least a first portion of the power cycle, wherein the input current is less than or equal to the threshold during the at least a second portion of the power cycle.

12. The apparatus of claim 11, wherein the processing system is further configured to receive a command that indicates an average amount of power to be delivered to the at least one substantially resistive load.

13. An apparatus for increasing power factor, comprising:
a processing system configured to:
determine an input voltage and an input current of a power system driving a low power factor load, the input voltage varying based on a power cycle;
determine at least a first portion of the power cycle at which the input current exceeds a threshold;
receive a command that indicates an average amount of power to be delivered to the at least one substantially resistive load; and
couple at least one substantially resistive load to the low power factor load during at least a second portion of the power cycle different from the at least a first portion of the power cycle, wherein the processing system is further configured to repeatedly connect and disconnect the at least one substantially resistive load to the low power factor load to deliver the average amount of power to the at least one substantially resistive load.

14. The apparatus of claim 11, wherein the processing system is further configured to:
determine a voltage drop with respect to an input node of the system; and
determine the input current using the voltage drop.

15. The apparatus of claim 11, wherein the low power factor load comprises at least one of an inductive load and a phase controlled load.

16. A computer program product, comprising:
a non-transitory computer-readable medium comprising code for:
determining an input voltage and an input current of a power system driving a low power factor load, the input voltage varying based on a power cycle;
determining at least a first portion of the power cycle at which the input current exceeds a threshold; and
coupling at least one substantially resistive load to the low power factor load during at least a second portion of the power cycle different from the at least a first portion of the power cycle, wherein the input current is less than or equal to the threshold during the at least a second portion of the power cycle.

17. The computer program product of claim 16, wherein the computer-non-transitory readable medium further comprises code for receiving a command that indicates an average amount of power to be delivered to the at least one substantially resistive load.

18. A computer program product, comprising:
a non-transitory computer-readable medium comprising code for:
determining an input voltage and an input current of a power system driving a low power factor load, the input voltage varying based on a power cycle;
determining at least a first portion of the power cycle at which the input current exceeds a threshold;
receiving a command that indicates an average amount of power to be delivered to the at least one substantially resistive load; and
coupling at least one substantially resistive load to the low power factor load during at least a second portion of the power cycle different from the at least a first portion of the power cycle, wherein the coupling comprises repeatedly connecting and disconnecting the at least one substantially resistive load to the low power factor load to deliver the average amount of power to the at least one substantially resistive load.

19. The computer program product of claim 16, wherein the determining the input current comprises:
determining a voltage drop with respect to an input node of the system; and
determining the input current using the voltage drop.

20. The computer program product of claim 16, wherein the low power factor load comprises at least one of an inductive load and a phase controlled load.

* * * * *